United States Patent [19]
Kimm

[11] 4,106,835
[45] Aug. 15, 1978

[54] ELECTRICAL WIRE CONNECTING DEVICE FOR JUNCTION BOX

[76] Inventor: Herbert J. Kimm, 4950 France Ave. S., Edina, Minn. 55435

[21] Appl. No.: 825,264

[22] Filed: Aug. 17, 1977

[51] Int. Cl.² .............................................. H01R 9/12
[52] U.S. Cl. .................................................. 339/95 D
[58] Field of Search .......................... 339/95 D, 198 R

[56] References Cited

U.S. PATENT DOCUMENTS

| | | | |
|---|---|---|---|
| 3,214,722 | 10/1965 | Weimer, Jr. | 339/95 D |
| 3,393,397 | 7/1968 | Manichl | 339/95 D |
| 3,885,852 | 5/1975 | Grove | 339/95 D |

FOREIGN PATENT DOCUMENTS

| | | | |
|---|---|---|---|
| 293,949 | 4/1968 | Australia | 339/95 D |
| 2,057,645 | 5/1972 | Fed. Rep. of Germany | 339/95 D |

*Primary Examiner*—Joseph H. McGlynn
*Attorney, Agent, or Firm*—Leo Gregory

[57] ABSTRACT

This invention relates to an electrical wire connecting device in connection with a junction box consisting of a housing having therein in spaced relation a plurality of wire gripping contacts with apertures being spaced about the housing to receive wires for insertion into the contacts and the housing and the wire ends connected thereto being disposed into a conventional junction box.

2 Claims, 6 Drawing Figures

ELECTRICAL WIRE CONNECTING DEVICE FOR JUNCTION BOX

BACKGROUND AND SUMMARY OF THE INVENTION

The invention herein relates to a device for connecting a plurality of electrical wires and to be disposed within a junction or terminal box.

In practice, electrical wires are connected by the use of electrical wire nuts. The connected wires and the attached wire nuts are then crammed into a junction box. Wire nuts must be of a size to receive therein the end portions of the number of wires to be connected together and frequently at least three wires require connection. Wire nuts are of a size to cause the total connection to have considerable bulk. There is also the element of costly time involved in connecting the end portions of wires or in changing connections and difficulty is frequently experienced in initially connecting wires or in removing the same from a junction box for changing connections.

The device herein consists of a housing having in spaced relation therein a plurality of wire gripping contacts with the hot wires and return wires being separated by an insulating barrier. The stripped wire ends are merely inserted into access apertures in the housing to engage and be gripped by the contacts therein and held against withdrawal. The housing with the attached wires is then inserted into the junction box.

It is an object of this invention, therefore, to provide a convenient means for connection of electrical wires and for convenient disposal of the connected wire ends into a junction box.

It is another object of this invention to provide a housing adapted to receive electrical wire ends therein and being adapted to be disposed into a junction box.

More specifically it is an object of this invention to provide a housing having therein a plurality of spaced wire gripping contacts adapted to have electrical wire end portions disposed therein, said wire end portions being gripped against withdrawal, apertures in said housing for insertion of said wires, a barrier insulating the hot wires from the return wires and the housing being adapted to be disposed within a junction box.

With reference to the preceding object, it is also an object of this invention to provide for the quick removal of wires from said receptacle.

These and other objects and advantages of the invention will be set forth in the following description made in connection with the accompanying drawings in which like reference characters refer to similar parts throughout the several views and in which.

DESCRIPTION OF A PREFERRED EMBODIMENT

Figure 1:
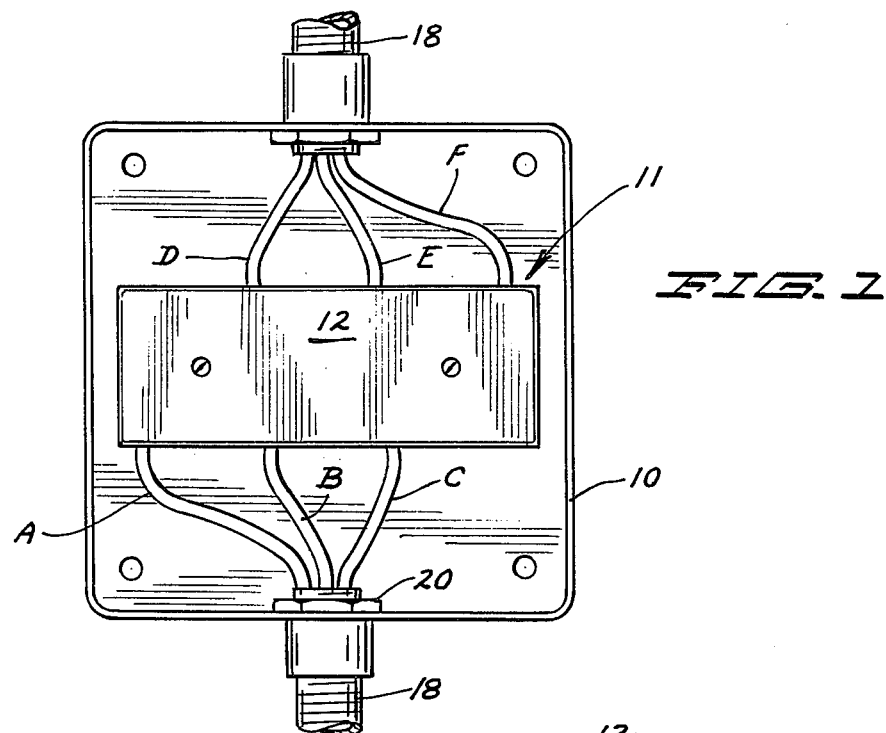
FIG. 1 is a view in elevation showing the device in operating position.
Figure 2:
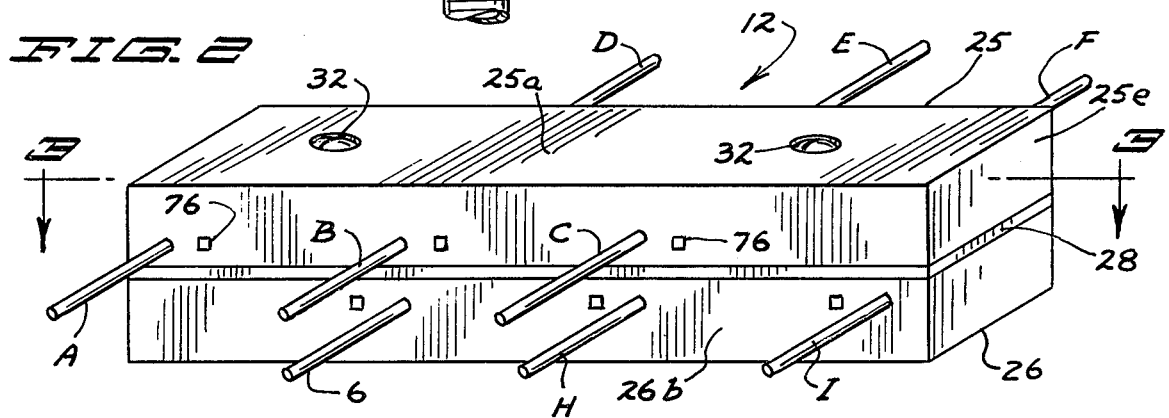
FIG. 2 is a view in perspective.

Referring to FIG. 1, a conventional electrical junction box 10 is shown having disposed therein the device 11 which comprises an electrical wire connector and which is the subject matter of the invention herein. Extending outwardly of said device 11 are shown wires A, B, C and D, E, F respectively being disposed through rigid conduits 18 extending outwardly of said junction box 10 and said conduits are secured by conventional nuts 20.

Referring to the remaining FIGS., said device 11 is shown to be a housing 12 substantially parallelepiped in form consisting of housing portions 25 and 26 and having an insulating means comprising plate member or barrier 28 disposed therebetween flush with the outer walls thereof.

Said housing portion 25 has a top wall 25a, side walls 25b and 25c and end walls 25d and 25e. Said housing portion 26 has a bottom wall 26a, side walls 26b and 26c and end walls 26d and 26e.

Formed within said housing portion 25 is chamber 29 and formed within said housing portion 26 is a chamber 30.

Said top wall 25a has therein a pair of spaced countersunk openings 32 having depending inwardly thereof cylindrical bored bosses 33. Said bottom wall 26a has openings 35 vertically aligned with said openings 33 and having inwardly extending cylindrical bored bosses 36. Extending through the openings 33 and 36 and their respective bosses are nutted bolts 40, the same being countersunk to be flush with their adjacent surfaces. Said inwardly extending bosses 33 and 36 extend toward the insulating plate member 28 which has openings 41 to accommodate said bolts 40.

Adapted to be disposed within said housing portions 25 and 26 in oppositely facing relation at each side of said plate member 28 are plate like electrical wire holding members 45 and 46 of which the member 45 will be described in detail as representative of both.

The member 45 comprises a conductive brass plate or conducting member 50 having openings 51 therein to accommodate the bolts 40. Struck from said base plate 50 as illustrated are upwardly angled longitudinally spaced transverse contact plate portions or contacts 55, 56 and 57 and corresponding thereto and substantially oppositely thereof are contacts 59, 60 and 61. The contacts 56, 59 and 57, 60 are shown to be transversely aligned and the contacts 55 and 61 project outwardly at opposite ends of said plate 50 as shown.

To cooperate with said upwardly angled or upstanding contacts 55 – 61 are upwardly angled longitudinally extending tongue contact members 66, 67 and 68 cooperating with the contacts 55, 56 and 57 and tongue contact member 69, 70 and 71 cooperating with the contacts 59, 60 and 61.

Referring now to the contact 55 and the tongue member 66 for a description representative of all like cooperating contact portions, the tongue member 66 is longitudinally curved as shown for spring action, it is angled inwardly of the contact member 55 and has its free end tip portion 66a extended to engage the contact 55 and is sufficiently elongated to frictionally grip the adjacent surface of the contact 55. Said contact 55 and said tongue member 66 are separable to receive a wire inserted therebetween but draw together to frictionally resist the withdrawal of such a wire.

It is noted that the upstanding contact 55 has a transversely angled portion 55a substantially centrally and longitudinally thereof and the adjacent end of the tongue member 66a will have a substantially corresponding configuration for in effect a mating engagement.

Figure 3:
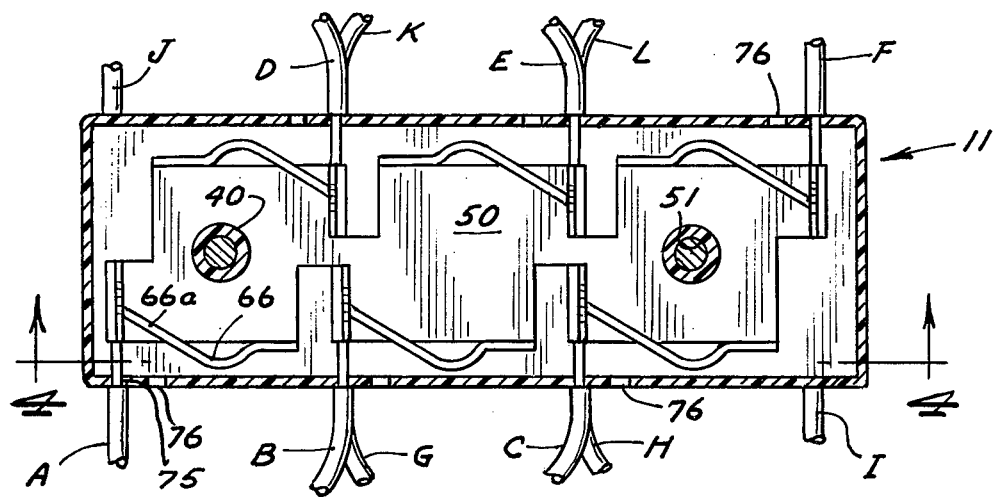
FIG. 3 is a view in horizontal section taken on line 3—3 of FIG. 2 as indicated.

The member 45 will be formed of a conductive spring like material such as brass whereby particularly the contact portion as represented by 66 will be resilient or spring-like. As shown in FIG. 3, the electrical wire A disposed between the contact 55 and the tongue member 66 will be securely held and any attempt to withdraw it will serve to tighten the hold of the contact portion 66a upon it.

It will be understood that a stripped portion of the wire A will be inserted between said members 55 and 66a. The combination of contacts 55 and 66 and as representative of all the other like combinations of contacts in securing a wire therebetween is sometimes referred to hereinafter as a receptacle.

Figure 4:
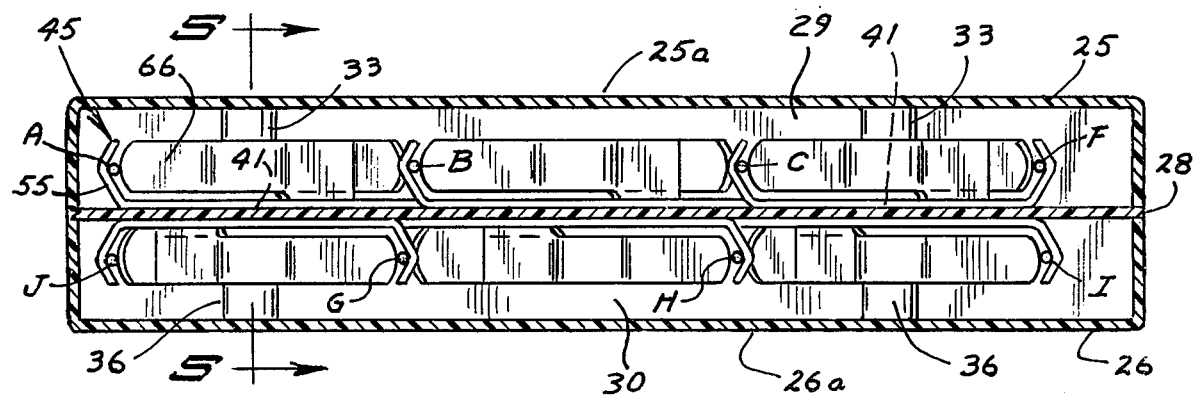
FIG. 4 is a view in vertical longitudinal section taken on line 4—4 of FIG. 3 as indicated.
Figure 5:
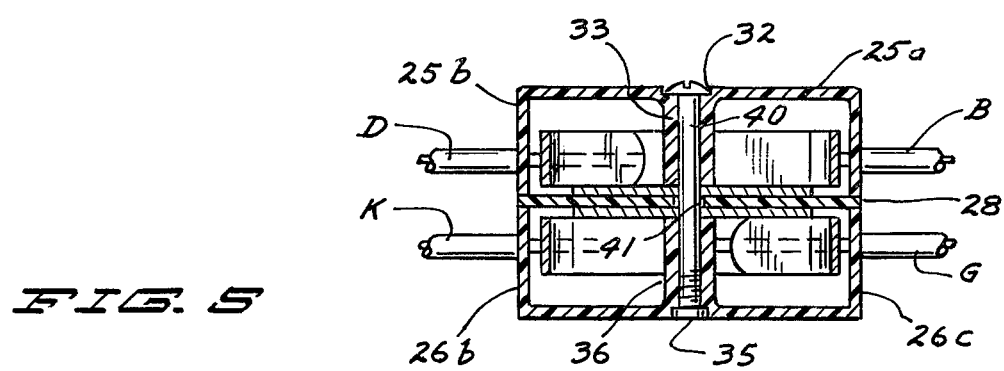
FIG. 5 is a view in vertical cross-section taken on line 5—5 of FIG. 4 as indicated.
Figure 6:
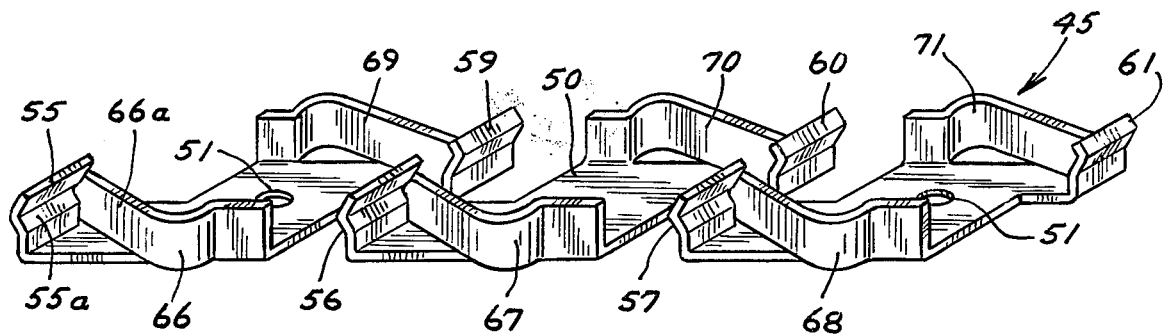
FIG. 6 is a view in perspective of a detail of structure of the device herein.

The members 45 and 46 are positioned within the housing as shown in FIG. 4 and with the bosses 33 and 36 being of a length to engage them and with the presence of bolts 40, the same are secured in position.

In alignment with the contact portions 55a and the other like portion are apertures or openings 75 through which electrical wires will be inserted as shown in FIG. 3.

Closely spaced from each of the apertures or openings 75 are apertures 76 through which a tool such as a wire or screwdriver may be inserted to move or dislodge the member 66 and like members inwardly to release the electrical wire held thereby.

The connector device 11 is here illustrated having a capacity to receive three hot wires at each upper side thereof and three return wires at each lower side thereof. It will be understood that the present embodiment is illustrative only and that the member 11 may be made in sizes appropriate to be received within conventional junction boxes.

Referring to FIGS. 2 - 5, wires A - L are indicated as being connected to each receptacle in the embodiment here shown.

The device 10 will be of a size to be readily positioned and secured within a junction box. The face of the box 10 will have been removed.

The wires to be connected will first be drawn through the conduits 18 and through the junction box 10. The end portions of said wires will be stripped as is conventional and will be inserted into the appropriate of the apertures 75 to make the desired connections.

Instead of using wire nuts, the end portion of a wire is simply inserted into an appropriate aperture 75.

Though not here shown, the box can be identified by color to indicate, for example, that the upper portion 75 shall receive the hot wires and the housing portion 26 will receive the return wires. The wires are in a neat order and may be readily identified.

The device 10 with the wire ends secured therein is simply pressed into the junction box and the junction box will have the cover plate, not here shown secured therein.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. An electrical wire connecting device to be disposed into a junction box, having in combination,
    a housing having a pair of superposed chambers therein,
    an insulating barrier between said chambers,
    a conductive member disposed within each of said chambers,
    each of said conductive members comprising
    a common base plate,
    a plurality of right angled wall members struck from said base plate being disposed transversally of said housing and each having a medial angled channel thereacross,
    a plurality of spring like tongue members struck from said base plate corresponding to each of said wall members and being disposed at right angles thereto and in a direction longitudinally of said housing,
    said tongue members respectively having engagement with said wall members,
    said tongue members having free end portions corresponding to the configuration of said channels of said wall members for mating engagement therewith to secure therebetween a conductive wire of no required minimum size, and
    said tongue members respectively engaging said wall members at an angle in a direction away from the direction of the insertion of a wire therebetween.

2. The structure set forth in claim 1, wherein
    said wall and corresponding tongue members being formed at each side of said base plate in opposed staggered relation, and
    openings in the side walls of said housing for insertion of wires between said wall members and their respective tongue members.

* * * * *